May 28, 1968
J. J. CALAMAN
3,385,381
MINERAL WORKING BURNER APPARATUS
Filed June 13, 1966
2 Sheets-Sheet 1
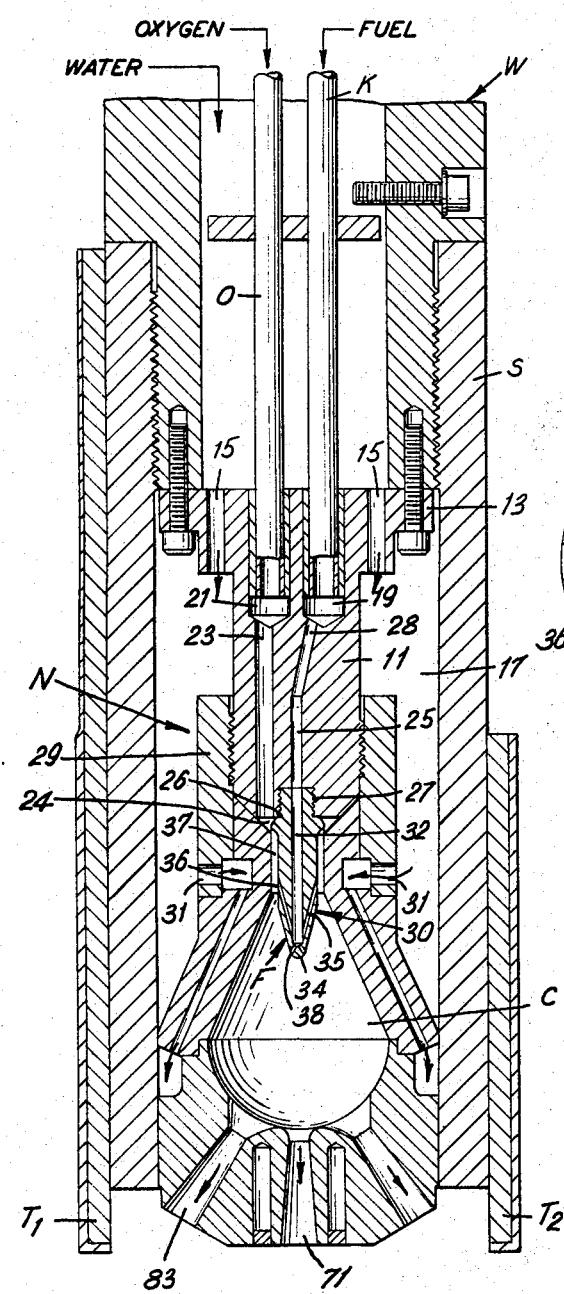
Fig. 1.
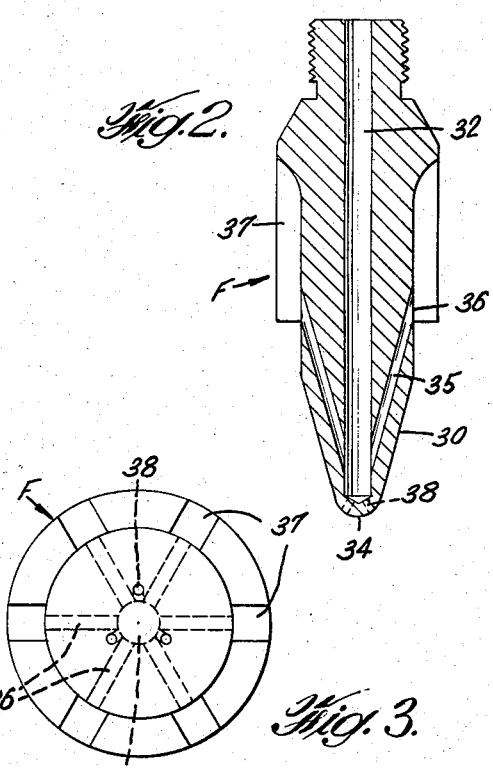
Fig. 2.
Fig. 3.
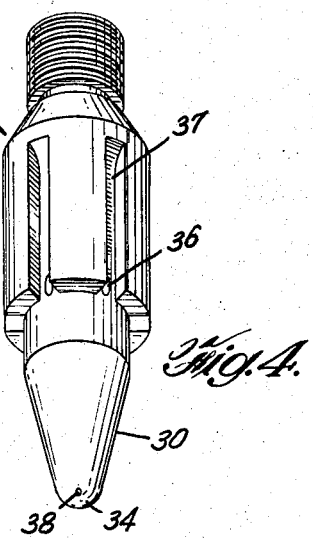
Fig. 4.
INVENTOR
JOSEPH J. CALAMAN
BY Lawrence G. Kastriner
ATTORNEY

United States Patent Office 3,385,381
Patented May 28, 1968

3,385,381
MINERAL WORKING BURNER APPARATUS
Joseph J. Calaman, Aurora, Minn., assignor to Union Carbide Corporation, a corporation of New York
Filed June 13, 1966, Ser. No. 557,251
3 Claims. (Cl. 175—14)

This invention relates to improvements in mineral working burners and particularly to a novel device for injecting fuel and oxidant into the combustion chamber of such burners whereby a more thorough mixture will be formed which will burn very efficiently.

The main object of the invention is to provide a novel fuel injector device which will form an intimate mixture of fuel oil and oxygen within the combustion chamber of a mineral working burner, such that a very efficient high temperature combustion will result.

Another object is to provide a fuel injector device for a mineral working burner which will produce a highly efficient combustion reaction over a wide range of oxygen to fuel ratios.

Still another object is to provide a fuel injector device for a mineral working burner which will enable the burner to pierce a hole in a rock with increased speed as compared to operation with prior art mineral working burner apparatus.

Yet another object is to provide a novel fuel injector device for accomplishing the foregoing objects, which device will also be capable of withstanding the intense combustion chamber heat, without rapidly burning out.

Other objects and advantages of the invention will be apparent from the remaining disclosure, drawing and appended claims.

In the drawings:

FIGURE 1 is a longitudinal sectional view of the front end portion of a mineral working blowpipe embodying the fuel injector device of the invention;

FIGURE 2 is an enlarged longitudinal sectional view of the fuel injector device shown in FIGURE 1;

FIGURE 3 is a front end view of the fuel injector shown in FIGURE 2, looking from the bottom, FIGURE 4 is a perspective view of the same fuel injector device.

Figure 5:
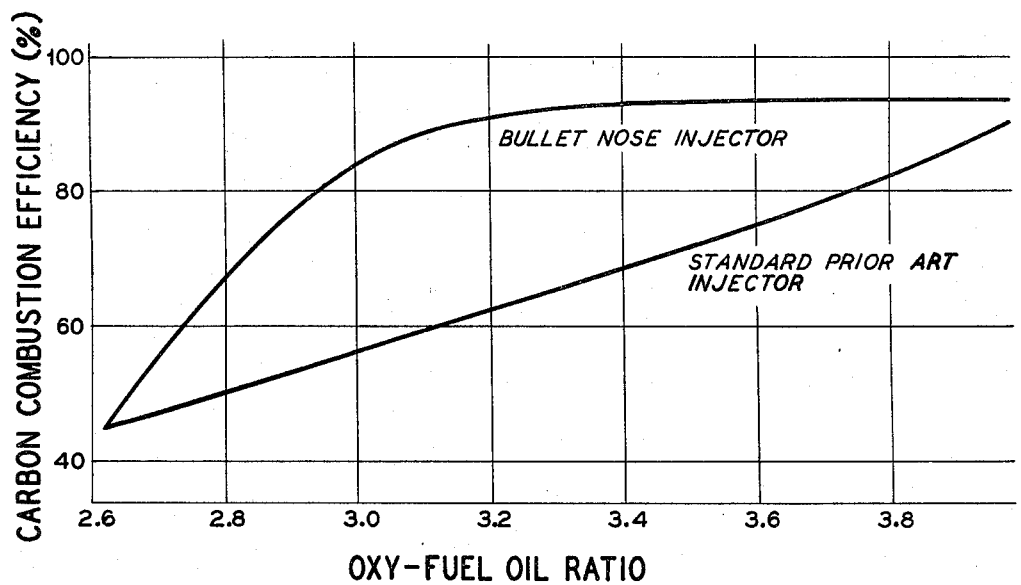
FIGURE 5 is a graph plotting carbon combustion efficiency vs. oxygen-fuel ratio for the fuel injector of the invention and for a conventional prior art type injector.

Referring to the drawing, a mineral working blowpipe with which the fuel injector of the invention may be used is illustrated. The blowpipe consists of a burner nozzle N having an internal combustion chamber C which is supplied with an oxidant such as oxygen by a longitudinal tube O, and with a fuel such as kerosene or fuel oil by a second longitudinal tube K alongside of tube O. Burner nozzle N is preferably formed of metal having high heat conductivity, such as copper or bronze.

A steel reamer sleeve S is threaded at its rear end over a longitudinal water tube W surrounding both of the tubes O and K, and extends forwardly over burner nozzle N to a position a short distance in back of the burner nozzle front end. Longitudinally extending radial teeth $T_1$ and $T_2$ on the outside of sleeve S project forwardly therefrom to a position about even with the front end of burner nozzle N, for grinding up and disintegrating detritus and for sizing a hole.

All three of the tubes, W, O, and K extend rearwardly to a swing joint (not shown) which may be of the type disclosed and claimed in U.S. Patent No. 2,628,817 issued Feb. 17, 1953 to Ray O. Wyland, Jr. Such a swing joint supplies fuel, oxygen and water to the respective tubes while permitting the tubes, the sleeve S, and the burner nozzle N all to rotate as a unit during the piercing of a hole in rock.

The burner nozzle N includes a cylindrical header 11 having an annular flange 13 at its upper end fitting against the lower end of water tube W and bolted thereto. Water ducts 15 extend through flange 13 for conducting cooling water from tube W into an annular water chamber 17 between burner nozzle N and sleeve S.

Two parallel longitudinal bores 19 and 21 extend down from the top of header 11 for receiving fuel and oxygen supply tubes K and O respectively. An eccentrically arranged oxygen duct 23 leads from bore 21 to an orifice in the front face of header 11 which in turn will discharge a flow of oxygen into conical axial counterbore 24 therein. A fuel duct 25 leads from bore 19 to an axially arranged conical orifice 26 in the front face of header 11, and includes a threaded axial front portion 27 and a rear inclined portion 28 connected to bore 19.

Burner nozzle N also includes a coupling sleeve 29 threaded over the lower portion of header 11 and having a series of circumferentially arranged radial water ducts 31 extending therethrough below the header.

The novel fuel injector device F of the invention is suspended into the cavity of combustion chamber C from its point of connection to the front portion 27 of duct 25. The elongated fuel injector F has a front end portion 30 which has an inverted frustro-conical shape resembling the nose of a bullet. The fuel injector has an axial longitudinal bore 32 extending from the rear end portion of the injector to a point just short of the forward face 34 of the front end. A plurality of drillings 35 extend rearwardly from the front end portion of the longitudinal bore 32 to a plurality of discharge ports 36 on the periphery of the injector body. The discharge ports are preferably inclined upwardly so as to discharge in a generally rearward direction, countercurrent to, and in the path of the flow of oxidant, as will be described hereinafter. The discharge ports 36 are located in alignment with longitudinal grooves 37 on the external surface of the injector body. These grooves direct the oxygen from counterbore 24 in a plurality of axial high velocity streams, into contact with fuel oil being discharged upwardly through discharge ports 36. The resulting combustible mixture is guided in a smoothly converging conical pattern within the burner nozzle combustion chamber by the bullet-shaped external front end portion of the injector body. A portion of the heat within the combustion chamber is utilized to preheat the fuel oil in the front end portion of axial bore 32 as well as in passages 35. This produces an intensely hot and very efficient combustion reaction. The hot combustion products are discharged from the burner through discharge passages 71 and 83 and directed at the rock to be worked.

Whereas the prior art fuel injectors of the type disclosed in U.S. Patent No. 2,794,620, issued June 4, 1957 to C. S. Arnold et al. operate most efficiently at about stoichiometric oxygen-fuel proportions, the injector device of this invention has surprisingly been found to operate at about its maximum efficiency over a very wide range of oxygen to fuel proportions. This characteristic is illustrated in FIGURE 5 in connection with a mineral working burner of 10,000 c.f.h. oxygen throughput. As shown therein, the burner can operate in the near peak efficiency of oxygen-fuel oil ratios between 3.2 and 4.0 when equipped with the fuel injector of the invention, whereas the same burner with a prior art type injector must be operated within a very narrow range, near a ratio of about 4.0 to obtain maximum combustion efficiency. The ability to operate a burner near its maximum combustion efficiency when operating over a wide range of oxygen to fuel oil ratios is an important advantage since it eliminates the necessity for close control of the process fluids during operation, and minimizes the cost of control equipment.

Although the greatest portion of fuel oil is preferably discharged through discharge ports 36, it is very advantageous to discharge a small portion of the fuel through a plurality of spaced drillings 38 in the forward face of the injector body. It has been found that the service life of the injector will thereby be greatly increased due to the cooling action of the liquid fuel on the forward surfaces of the injector body.

To demonstrate the effectiveness of the fuel injector of the invention comparative rock piercing tests were conducted using a 16,000 c.f.h. oxygen throughput burner, incorporating, alternatively, the fuel injector of the invention and a typical prior art injector of the type illustrated in U.S. Patent 2,794,620. The rock worked upon in each case was magnetic taconite. With the same flow conditions, 19.6 c.f.h. of rock was removed when the burner was equipped with the prior art injector whereas the same burner when operated with the injector of the invention produced a rock removal of 24.4 c.f.h.

What is claimed is:

1. A fuel injector device for a mineral working burner which comprises: an elongated body having a rear end portion for connection to a source of fuel and a front end portion for insertion into the combustion chamber of the burner, said front end having an inverted frustro-conical shape, said body having an axial longitudinal bore therein extending from said rear end portion to a point just short of the forward face of said front end; a plurality of spaced drillings extending rearwardly from the front end portion of said axial longitudinal bore to a plurality of discharge ports on the periphery of said body, said discharge ports being located in alignment with longitudinal grooves on the external surface of said body within which streams of oxidant may pass to mix with the fuel discharged from said ports whereby the fuel will be preheated prior to its mixing with oxidant and whereby the resulting fuel-oxidant mixture formed will be guided in a smoothly converging conical pattern within the burner combustion chamber by the external front end surface of said body.

2. A fuel injector device as claimed in claim 1 wherein said front end has a plurality of spaced drillings in its forward face to discharge a portion of the fuel from said axial longitudinal bore into the burner combustion chamber whereby said forward face will be cooled from the intense heat in the combustion chamber by the flow of fuel.

3. A fuel injector device as claimed in claim 1 wherein said discharge ports on the periphery of said body are formed at a rearward angle so as to discharge the fuel in a rearward direction, substantially countercurrent to the flow of oxidant.

References Cited

UNITED STATES PATENTS

| | | | |
|---|---|---|---|
| 2,090,150 | 8/1939 | Pontius | 158—78 X |
| 2,794,620 | 6/1957 | Arnold et al. | 175—14 |
| 2,878,065 | 3/1959 | Watkins | 158—73 X |
| 3,116,798 | 1/1964 | Job | 175—14 |
| 3,173,499 | 3/1965 | Ross | 175—14 |

CHARLES E. O'CONNELL, *Primary Examiner.*

DAVID H. BROWN, *Examiner.*